(12) United States Patent
Mori et al.

(10) Patent No.: US 8,788,456 B2
(45) Date of Patent: Jul. 22, 2014

(54) VIDEO SERVER AND METHOD FOR MANAGING ACTIVITY LOG

(75) Inventors: Toshiki Mori, Kodaira (JP); Hiroyuki Watanabe, Koganei (JP); Naoko Satoh, Hachioji (JP); Shuichi Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 13/356,321

(22) Filed: Jan. 23, 2012

(65) Prior Publication Data
US 2012/0239615 A1 Sep. 20, 2012

(30) Foreign Application Priority Data
Mar. 16, 2011 (JP) .................................. 2011-058063

(51) Int. Cl.
*G06F 17/30* (2006.01)

(52) U.S. Cl.
CPC .............................. *G06F 17/30781* (2013.01)
USPC .......................................... 707/609; 707/769

(58) Field of Classification Search
CPC .................... H04N 21/23113; H04N 21/4667; H04N 21/44204; H04N 21/44222; G06F 11/3476; G06F 17/30781
USPC .................... 707/609; 717/609, 769, 913, 914
See application file for complete search history.

(56) References Cited

U.S. PATENT DOCUMENTS

| | | | | |
|---|---|---|---|---|
| 6,411,770 B1 * | 6/2002 | Ito et al. | ......................... | 386/241 |
| 7,017,016 B2 * | 3/2006 | Chujo et al. | .................. | 711/147 |
| 8,055,655 B1 * | 11/2011 | He et al. | ......................... | 707/727 |
| 8,266,659 B2 * | 9/2012 | Urdang et al. | .................. | 725/88 |
| 8,296,239 B2 * | 10/2012 | Nonaka | ........................... | 705/57 |
| 8,364,023 B2 * | 1/2013 | Boston et al. | ................. | 386/294 |
| 8,392,479 B1 * | 3/2013 | Pantin | ........................... | 707/823 |
| 2003/0013459 A1 * | 1/2003 | Rankin et al. | ................. | 455/456 |
| 2003/0154485 A1 * | 8/2003 | Johnson et al. | ................ | 725/89 |
| 2006/0059322 A1 * | 3/2006 | Poston | ........................ | 711/162 |
| 2008/0162594 A1 * | 7/2008 | Poston | ........................ | 707/202 |
| 2010/0011031 A1 * | 1/2010 | Huang et al. | .................. | 707/202 |

FOREIGN PATENT DOCUMENTS

| JP | 11-120038 | 4/1999 |
|---|---|---|
| JP | 2005-065023 | 3/2005 |
| JP | 2006-309804 | 11/2006 |
| JP | 2010-171890 | 8/2010 |
| JP | 2010-182194 A2 | 8/2010 |
| JP | 2010-218313 | 9/2010 |

OTHER PUBLICATIONS

U.S. Appl. No. 13/016,516, Jan. 28, 2011, Mori.
Office Action received in Japanese Patent Application No. 2011-058063, mailed Mar. 12, 2013; (in six pages).

* cited by examiner

*Primary Examiner* — Shahid Alam
*Assistant Examiner* — Evan Aspinwall
(74) *Attorney, Agent, or Firm* — Knobbe, Martens, Olson & Bear LLP (57) ABSTRACT

According to one embodiment, a video server includes a plurality of processing modules and a maintenance/management module. The processing modules output an activity log file to the maintenance/management module. The maintenance/management module includes a storing medium and a maintenance/management controller. The controller determines whether the storing medium has a free region for recording the activity log file in the storing medium. The controller deletes an oldest activity log file recorded in the storing medium to form a free region if the storing medium has no free region. The controller writes the activity log file in the formed free region.

10 Claims, 11 Drawing Sheets

| Log transmitters | Set names | Names of activity log files |
|---|---|---|
| Video server 80-1 | Server1 | Server1xxxxxx.log |
| Video server 80-2 | Server2 | Server2xxxxxx.log |
| Video server 80-3 | Server3 | Server3xxxxxx.log |

F I G. 12

F I G. 13

VIDEO SERVER AND METHOD FOR MANAGING ACTIVITY LOG

CROSS-REFERENCE TO RELATED APPLICATIONS

This application is based upon and claims the benefit of priority from prior Japanese Patent Application No. 2011-058063, filed Mar. 16, 2011, the entire contents of which are incorporated herein by reference.

FIELD

Embodiments described herein relate generally to a video server and method for managing activity log.

BACKGROUND

Digitization in the field of broadcasting has been promoted as seen in the Digital Terrestrial Television Broadcasting. As digitized program contents are required to have high image quality, digitized program contents tend to have large capacity. For this reason, a video server is required to record and play digitized program contents which have large capacity. In addition, the video server tends to be required to enable process to multichannel, that is to say, simultaneously recording and playing a plurality of program contents.

In order to record and play the digitized program contents having a large capacity and enable to process multichannel, the video server is required to increase the processing rate. In order to increase the processing rate, the video server includes a plurality of CPUs, simultaneously executes a plurality of processing by CPUs. In addition, the video server can provide the user with service of a higher level by operating a plurality of devices each having a CPU mounted thereon in cooperation with each other.

Incidentally, all of the CPUs are not mounted on a single substrate, but are mounted on respective substrates, in the video server. The video server is constituted by combining a plurality of substrates on which the CPUs are mounted, or housings containing a plurality of such substrates in accordance with the degree of the required processing capability. Each of CPUs creates an activity log since it records device activity conditions. The activity log created by each of the CPUs is collected in a CPU which performs the maintenance of the video server in reference to the collected activity log. However, since an inner storage region of the video server is limited, the activity log cannot be newly collected if the inner storage region is filled with the activity data. For this reason, the CPU can refer to the collected activity log to maintain the video server, but may be unable to refer to the latest activity log.

DETAILED DESCRIPTION

In general, according to one embodiment, a video server includes a plurality of processing modules and a maintenance/management module. The processing modules each include a CPU which controls an operation. The CPU creates an activity log based on a control condition of the operation. The CPU outputs the created activity log as an activity log file. The maintenance/management module manages the activity log file output from each of the plurality of processing modules. The maintenance/management module includes a storing medium and a maintenance/management controller. The storing medium records the activity log file. The maintenance/management controller determines whether the storing medium has a free region for recording the activity log file. The maintenance/management controller writes the activity log file in the storing medium if the storing medium has the free region. The maintenance/management controller deletes an oldest activity log file recorded in the storing medium to form a free region if the storing medium has no free region. The maintenance/management controller writes the activity log file in the formed free region.

[First Embodiment]

Figure 1:
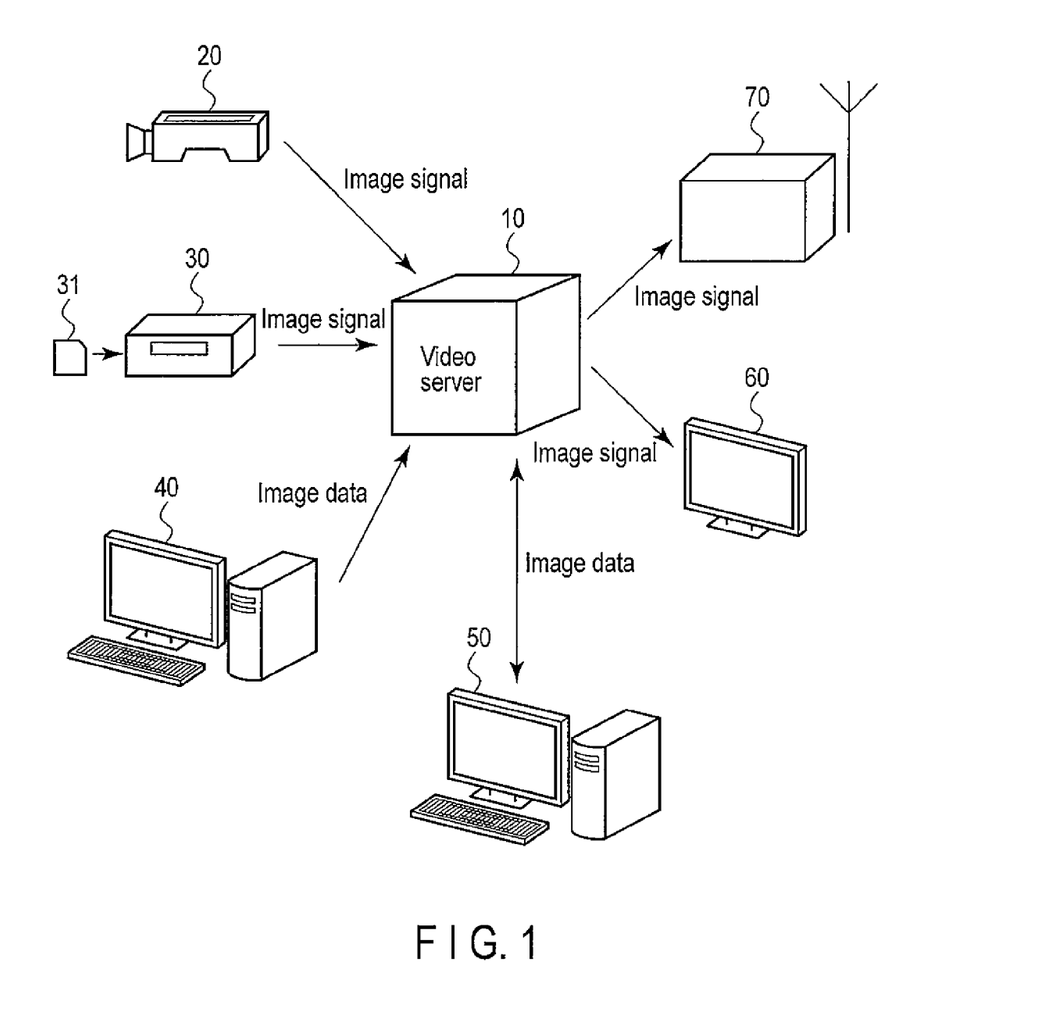
FIG. 1 is an illustration showing an example of a configuration of a broadcast program transmission system including a video server according to a first embodiment.

FIG. 1 is an illustration showing an example of a configuration of a broadcast program transmission system including a video server 10 according to a First Embodiment. The broadcast program transmission system includes the video server 10, a video camera 20, playback deck 30, an editor 40, an operation terminal 50, a monitor 60 and broadcast installation 70.

The video camera 20 outputs an video signal obtained by shooting to the video server 10.

An video recording medium 31 recording video data is inserted into the playback deck 30. The video data is an video signal encoded in a preset predetermined encoding format. The playback deck 30 reads the video data from the video recording medium 31, converts the video data into an video signal, and outputs the video signal to the video server 10.

The editor 40 reads out the video data stored in the video server 10 in response to a request from the user. The user edits the video data read out by the editor 40. The editor 40 outputs the edited video data to the video server 10.

The operation terminal 50 reads out the video data stored in the video server 10 in response to a request from the user. In addition, the operation terminal 50 outputs a control signal to the video server 10 in accordance with a user's instruction.

The monitor 60 receives the video signal output from the video server 10. The video signal is a signal obtained by decoding the video data stored in the video server 10. The monitor 60 displays the video signal output from the video server 10. The user confirms necessity of editing while watching the display of the monitor 60.

The broadcast installation 70 receives the video signal output from the video server 10. The broadcast installation 70 transmits the video signal output from the video server 10, toward an area in which the broadcasting service is provided.

The video server 10 includes at least one housing, and a plurality of processing modules are housed in the housing. In the video server 10, the processing modules are connected by a board for connection via sockets or cables. The processing modules are housed in accordance with the processing required for the video server 10, and a CPU is mounted on each of the processing modules. The number of the processing modules in the housing, and the number of the housing, in the video server 10, can be increased or decreased in response to the required performance. Each of the processing modules satisfies flexible expandability to respond to various types of required performances.

Figure 2:
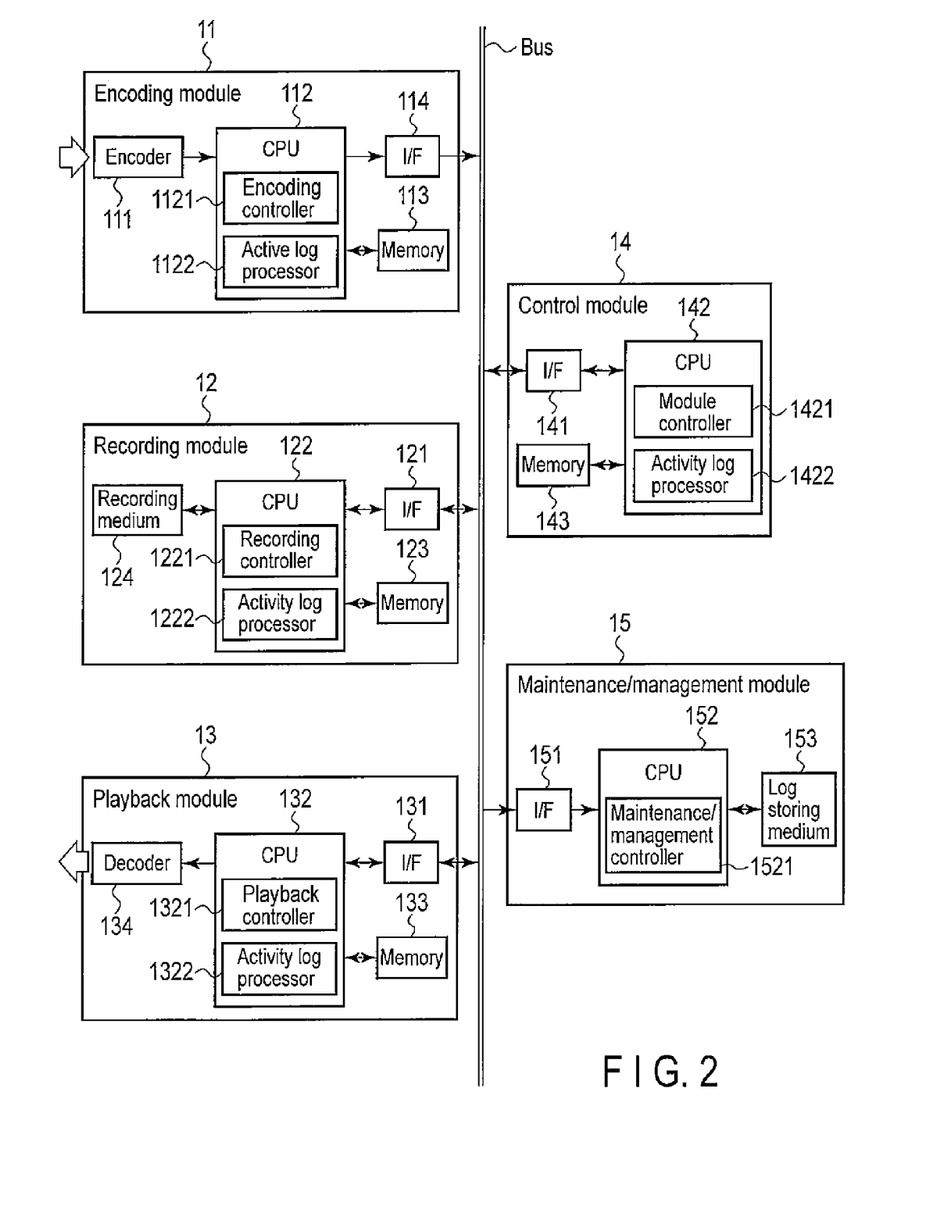
FIG. 2 is a block diagram showing a functional configuration of the video server in FIG. 1.

FIG. 2 is a block diagram showing a functional configuration of the video server 10 in FIG. 1. The video server 10 shown in FIG. 2 includes an encoding module 11, a recording module 12, a playback module 13, a control module 14, and a maintenance/management module 15. In FIG. 2, one module is mounted as each type of the modules, but the number of each module may not be one. A plurality of modules, of some types of the modules, may be mounted in the video server 10 in response to the required performance. For example, if video signals of a plurality of channels supplied from the outside need to be encoded, the encoding modules 11 corresponding to the channels in number are mounted in the video server 10. In addition, if the video signals of a plurality of channels need to be played back simultaneously, the playback modules 13 corresponding to the channels in number are mounted in the video server 10.

The video camera 20, playback deck 30, etc. are connected to the encoding module 11. The encoding module 11 receives the video signals output from the video camera 20, playback deck 30, etc. The encoding module 11 includes an encoder 111, a CPU 112, a memory 113 and an interface unit 114.

The encoder 111 encodes the supplied video signals in a preset encoding format, under encoding control supplied from the CPU 112. The encoder 111 outputs the encoded video data to the CPU 112.

The CPU 112 implements a encoding controller 1121 and an activity log processor 1122 by executing an application program.

The encoding controller 1121 executes encoding control for the encoder 111 in accordance with the control signal supplied from the control module 14.

The activity log processor 1122 creates an activity log in accordance with a situation of an operation executed by the encoding controller 1121. For example, when the encoding controller 1121 executes the encoding control for the encoder 111 and makes the encoder 111 encode the video signal, the activity log processor 1122 creates the activity log indicating that the encoding control has been executed. The activity log processor 1122 records the created activity log in the memory 113.

When a preset volume of activity logs is stored in the memory 113, the activity log processor 1122 creates an activity log file on the basis of the stored activity logs. At this time, the activity log processor 1122 attaches an identifier capable of identifying the own module to the activity log file. The activity log processor 1122 outputs the created activity log file to the interface unit 114.

The interface unit 114 connects the encoding module 11 with a bus. The interface unit 114 outputs the activity log file to the maintenance/management module 15 via the bus. In addition, the interface unit 114 outputs the video data encoded by the encoder 111 to the bus.

The recording module 12 includes an interface unit 121, a CPU 122, a memory 123 and a recording medium 124.

The interface unit 121 connects the recording module 12 with a bus. The interface unit 121 receives the video data encoded by the encoding module 11 via the bus and outputs the video data to the CPU 122. In addition, the interface unit 121 outputs the video data read from the recording medium 124 to the bus. Furthermore, the interface unit 121 outputs the activity log file created by the CPU 122 to the maintenance/management module 15 via the bus.

The CPU 122 implements a recording controller 1221 and an activity log processor 1222 by executing an application program.

The storing controller 1221 executes writing control of the video data encoded by the encoding module 11, for the recording medium 124, in accordance with the control signal supplied from the control module 14. In addition, the storing controller 1221 executes reading control of the recorded video data, for the recording medium 124, in accordance with the control signal supplied from the control module 14.

The activity log processor 1222 creates an activity log in accordance with a situation of an operation executed by the recording controller 1221. For example, when the recording controller 1221 executes the writing control for the recording medium 124, the activity log processor 1222 creates the activity log indicating that the writing control has been executed. In addition, when the recording controller 1221 executes the reading control for the recording medium 124, the activity log processor 1222 creates the activity log indicating that the reading control has been executed. The activity log processor 1222 records the created activity log in the memory 123.

When a preset volume of activity logs is stored in the memory 123, the activity log processor 1222 creates an activity log file on the basis of the stored activity logs. At this time, the activity log processor 1222 attaches an identifier capable of identifying the own module to the activity log file. The activity log processor 1222 outputs the created activity log file to the interface unit 121.

The recording medium 124 includes a nonvolatile semiconductor memory such as a flash memory, and writes the video data in the semiconductor memory under the writing control of the recording controller 1221. In addition, the recording medium 124 reads the video data from the semiconductor memory under the reading control of the recording controller 1221. The recording medium 124 outputs the video data to the interface unit 121 via the CPU 122.

The playback module 13 includes an interface unit 131, a CPU 132, a memory 133 and a decoder 134.

The interface unit 131 connects the playback module 13 with the bus. The interface unit 131 receives the video data encoded by the encoding module 11 and/or the video data read by the recording module 12 via the bus and outputs the video data to the CPU 132. In addition, the interface unit 131 outputs the activity log file created by the CPU 132 to the maintenance/management module 15 via the bus.

The CPU 132 implements a playback controller 1321 and an activity log processor 1322 by executing an application program.

The playback controller 1321 executes playback control for the decoder 134, in accordance with the control signal supplied from the control module 14.

The activity log processor 1322 creates an activity log in accordance with a situation of an operation executed by the playback controller 1321. For example, when the playback controller 1321 executes the playback control for the decoder 134 and makes the decoder 134 decode the video data, the activity log processor 1322 creates the activity log indicating that the playback control has been executed. The activity log processor 1322 records the created activity log in the memory 133.

When a preset volume of activity logs is stored in the memory 133, the activity log processor 1322 creates an activity log file on the basis of the stored activity logs. At this time, the activity log processor 1322 attaches an identifier capable of identifying the own module to the activity log file. The activity log processor 1322 outputs the created activity log file to the interface unit 131.

The decoder 134 decodes the video data in a preset decoding format, under the playback control of the playback controller 1321. The decoder 134 outputs the decoded video data to the outside.

The control module 14 includes an interface unit 141, a CPU 142, and a memory 143.

The interface unit 141 connects the control module 14 with the bus. The interface unit 141 outputs the control signal supplied from the CPU 142 to the bus. In addition, the interface unit 141 outputs the activity log file created by the CPU 142 to the maintenance/management module 15 via the bus.

The CPU 142 implements a module controller 1421 and an activity log processor 1422 by executing an application program.

The module controller 1421 transmits the control signals to control the operations of the modules in the video server 10, for example, the encoding module 11, the recording module 12, the playback module 13, and the maintenance/management module 15.

The activity log processor 1422 creates an activity log in accordance with a situation of an operation executed by the module controller 1421. For example, when the module controller 1421 transmits the control signal to the encoding module 11, the activity log processor 1422 creates the activity log indicating that the control signal has been transmitted to the encoding module 11. The activity log processor 1422 records the created activity log in the memory 143.

When a preset volume of activity logs is stored in the memory 143, the activity log processor 1422 creates an activity log file on the basis of the stored activity logs. At this time, the activity log processor 1422 attaches an identifier capable of identifying the own module to the activity log file. The activity log processor 1422 outputs the created activity log file to the interface unit 141.

The maintenance/management module 15 includes an interface unit 151, a CPU 152, and a log storing medium 153.

The interface unit 151 connects the maintenance/management module 15 with the bus. The interface unit 151 receives the activity log file output from each of the modules via the bus.

The CPU 152 implements a maintenance/management controller 1521 by executing an application program. The maintenance/management controller 1521 executes control for recording the activity log file output from each of the modules in the log storing medium 153.

The control which the maintenance/management controller 1521 executes upon recording the activity log file in the log storing medium 153 will be described below.

Example 1

Figure 3:
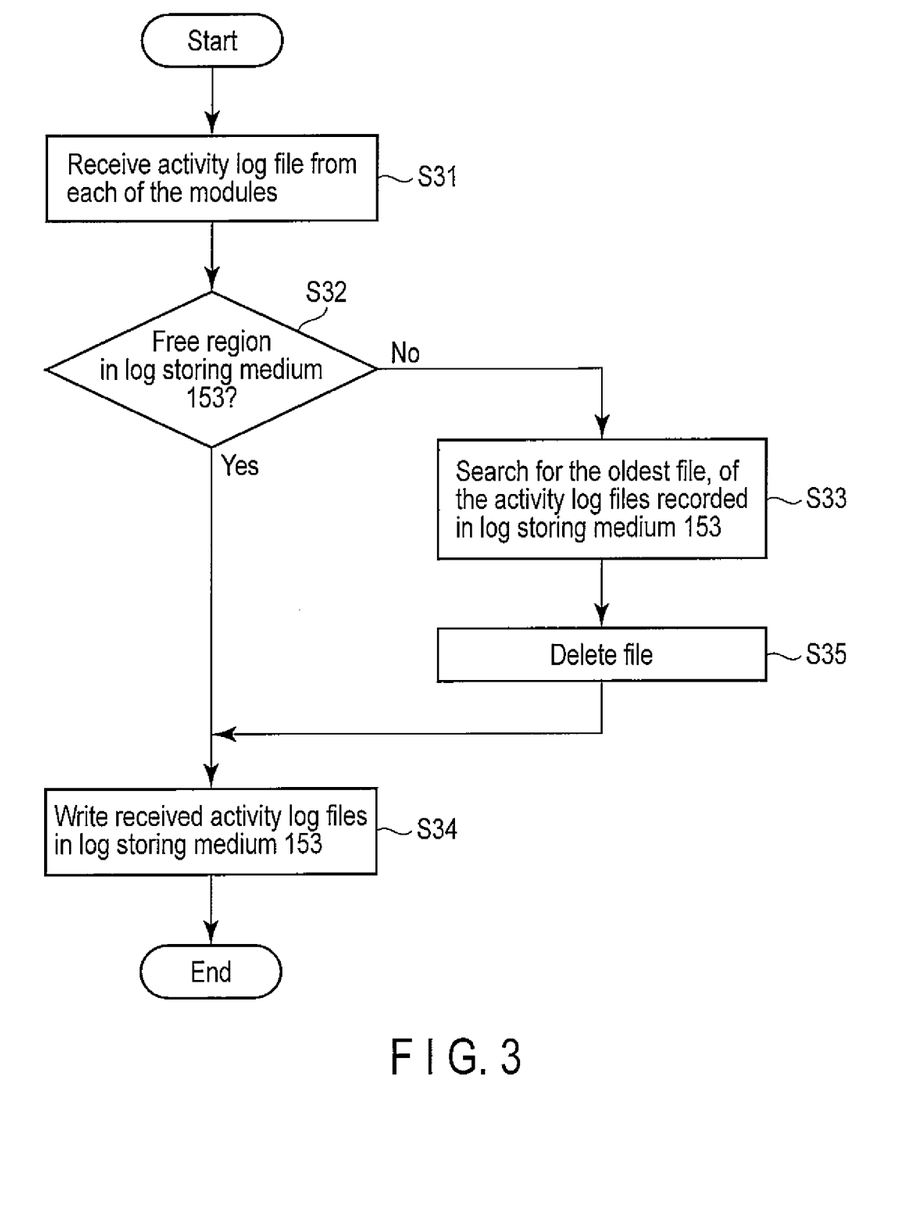
FIG. 3 is a flowchart of Example 1 in which a maintenance/management controller in FIG. 2 records an activity log files in a log storing medium.

FIG. 3 is a flowchart of Example 1 in which the maintenance/management controller 1521 records the activity log file in the log storing medium 153.

First, the maintenance/management controller 1521 receives the activity log file from each of the modules (step S31). The maintenance/management controller 1521 checks presence and absence of a free region in the log storing medium 153 (step S32). If the log storing medium 153 has no free region (NO in step S32), the maintenance/management controller 1521 searches for the oldest activity log file among the activity log files recorded in the log storing medium 153 (step S33). If the log storing medium 153 has a free region (YES in step S32), the maintenance/management controller 1521 records the received activity log files in the free region in the log storing medium 153 (step S34).

The maintenance/management controller 1521 forms a free region by deleting the oldest activity log file searched in step S33 (step S35). The maintenance/management controller 1521 shifts the processing to step S34.

As described above, the maintenance/management controller 1521 deletes the oldest activity log file in the log storing medium 153 to form free region if the maintenance/management controller 1521 receives a new activity log file in a state in which the log storing medium 153 has no free region. Then, the maintenance/management controller 1521 writes the new activity log file in the formed free region in the log storing medium 153. For this reason, a latest activity log file is always stored in the log storing medium 153.

Example 2

Figure 4:
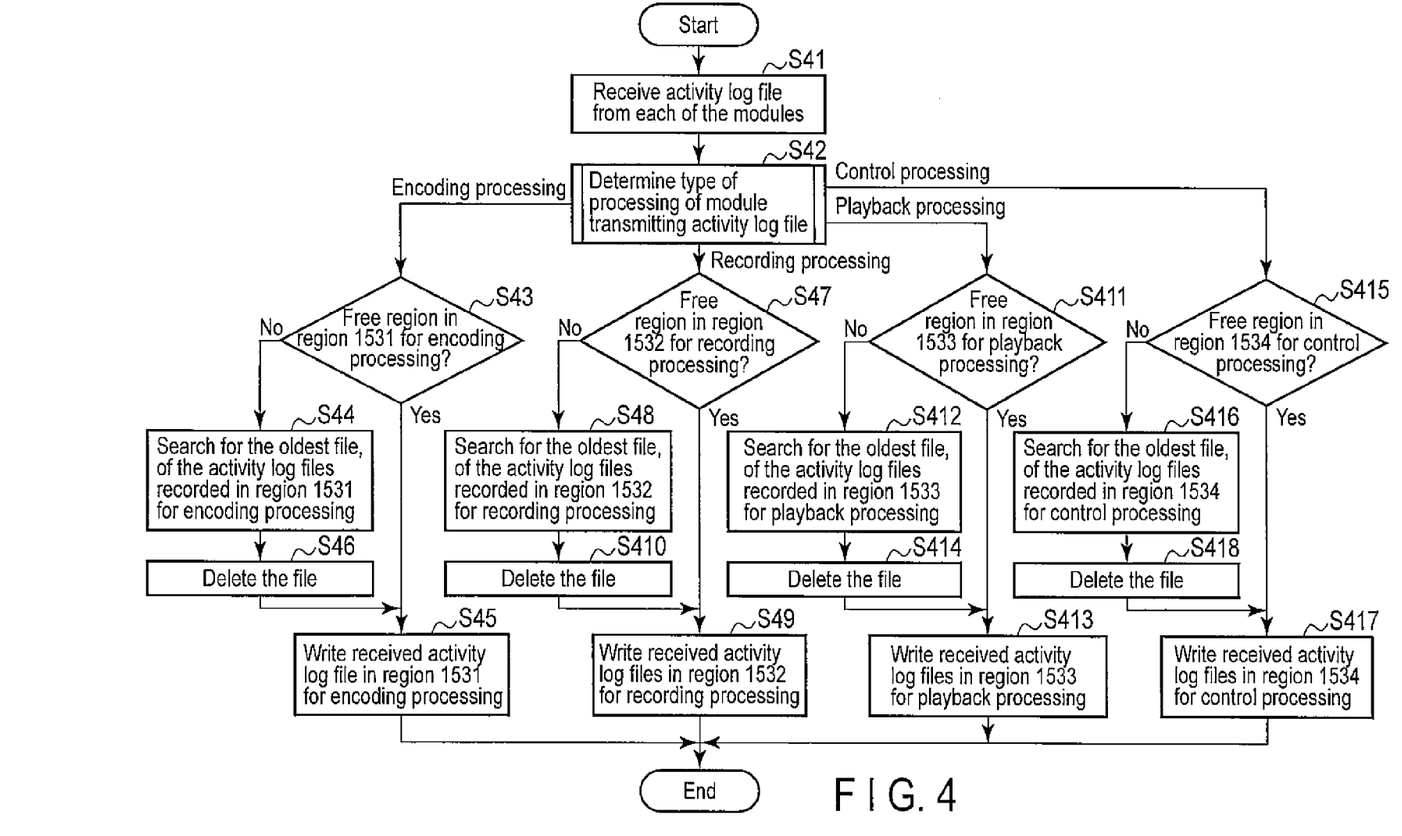
FIG. 4 is a flowchart of Example 2 in which the maintenance/management controller in FIG. 2 records the activity log files in the log storing medium.
Figure 5:
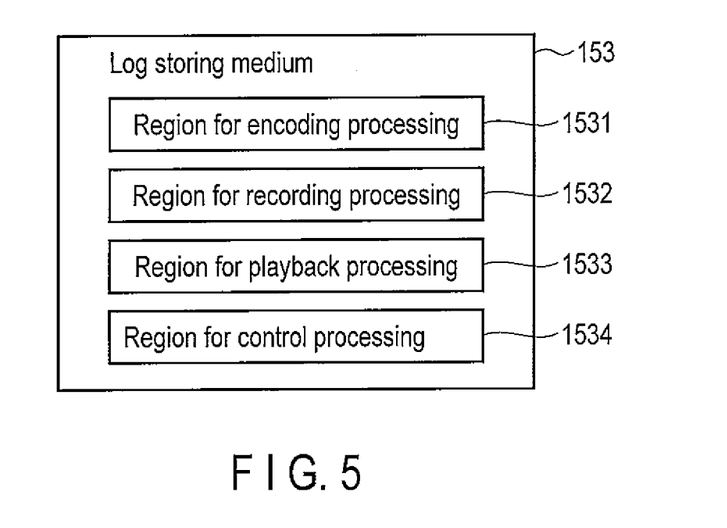
FIG. 5 is a block diagram showing a recording region of a log storing medium in processing in FIG. 4.

FIG. 4 is a flowchart of Example 2 in which the maintenance/management controller 1521 records the activity log files in the log storing medium 153. In Example 2, the maintenance/management controller 1521 allocates recording regions in the log storing medium 153 to respective module types as shown in FIG. 5. In other words, the maintenance/management controller 1521 divides the log storing medium 153 into a region 1531 for encoding processing, a region 1532 for recording processing, a region 1533 for playback processing and a region 1534 for control processing.

First, if the maintenance/management controller 1521 receives the activity log file from each of the modules (step S41), the maintenance/management controller 1521 determines the type of processing of the module which has transmitted the received activity log file by referring to an identifier attached to the activity log file (step S42). If the type of processing of the module transmitting the activity log file is the encoding processing, the maintenance/management controller 1521 determines whether the region 1531 in the log storing medium 153 has a free region (step S43). If the region 1531 has no free region (NO in step S43), the maintenance/management controller 1521 searches for the oldest activity log file, of the activity log files recorded in the region 1531 (step S44). If the region 1531 has a free region (YES in step S43), the maintenance/management controller 1521 records the received activity log file in the free region in the region 1531 (step S45).

The maintenance/management controller 1521 forms a free region by deleting the oldest activity log file searched in step S44 (step S46). Then, the maintenance/management controller 1521 shifts the processing to step S45.

If the type of processing of the module transmitting the activity log file is determined as the recording processing in step S42, the maintenance/management controller 1521 executes recording control of the activity log file for the recording processing in the formed free region in the region 1532 by the same processing as that in steps S43 to S46 (steps S47 to S410).

If the type of processing of the module transmitting the activity log file is determined as the playback processing in step S42, the maintenance/management controller 1521 executes recording control of the activity log file for the playback processing in the formed free region in the region 1533 by the same processing as that in steps S43 to S46 (steps S411 to S414).

If the type of processing of the module transmitting the activity log file is determined as the control processing in step S42, the maintenance/management controller 1521 executes recording of the activity log file for the control processing in the formed free region in the region 1534 by the same processing as that in steps S43 to S46 (steps S415 to S418).

As described above, if the maintenance/management controller 1521 receives the new activity log file in a state in which the log storing medium 153 has no free region, the maintenance/management controller 1521 searches for the oldest activity log file among the activity log files created by the modules of which types is corresponding to that of the modules transmitting the received activity log files. Then, the maintenance/management controller 1521 deletes the oldest activity log file to form free region and writes the new activity log file in the formed free region. The activity log of a lower use frequency can be prevented from being deleted by storing the activity log of a higher use frequency. For example, if the playback processing is frequently executed and the frequency of executing the encoding and recording processing is low, it is possible to prevent the activity log files of encoding and recording processing from being overwritten by the activity log files of the playback processing.

Example 3

In addition, the region 1531 to 1534 have the same capacity in FIG. 5, but the capacity of these regions may be automatically increased or decreased in accordance with the number of modules executing the same type of processing included in the video server 10. In this case, when the video server 10 activates, each of the modules notifies the maintenance/management module 15 of the activation. The maintenance/management controller 1521 counts the number of received notifications of activation for each type of processing and allocates the capacity of the log storing medium 153 in accordance with the number. In other words, if number a of encoding modules 11, number b of recording modules 12, number c of playback modules 13, and number d of control modules 14 are built in the video server 10, the maintenance/management module 15 receives number a of notifications of activation for the encoding processing, number b of notifications of activation for the recording processing, number c of notifications of activation for the playback processing, and number d of notifications of activation for the control processing, at the activation of the video server 10. The maintenance/management controller 1521 calculates the capacity of the region for each processing in the following manner, on the basis of the number of received notifications of activation.

Capacity of region for encoding processing =

$$(\text{Total Capacity}) \times a/(a+b+c+d)$$

Capacity of region for recording processing =

$$(\text{Total Capacity}) \times b/(a+b+c+d)$$

Capacity of region for playback processing =

$$(\text{Total Capacity}) \times c/(a+b+c+d)$$

Capacity of region for control processing =

$$(\text{Total Capacity}) \times d/(a+b+c+d)$$

Figure 6:
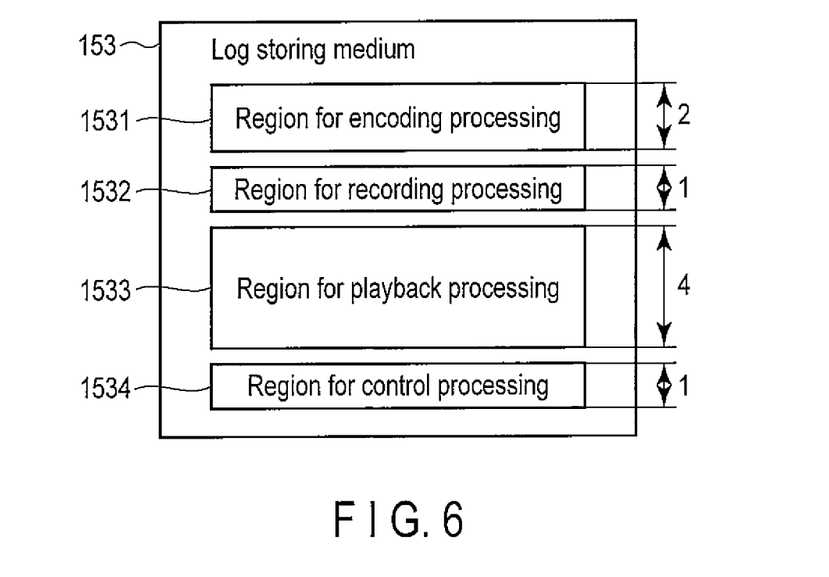
FIG. 6 is a block diagram showing the other example of a recording region of a log storing medium in FIG. 2.

FIG. 6 is an illustration showing the regions in the log storing medium 153 in which two encoding modules 11, one recording module 12, four playback modules 13, and one control module 14 are included in the video server 10. In each of the regions, the number of recordable activity log files is preset for each module. For example, since two encoding modules 11 are included in FIG. 6, ten activity log files for each modules, i.e., totally twenty activity log files are recorded in the region 1531 for encoding processing.

Figure 7:
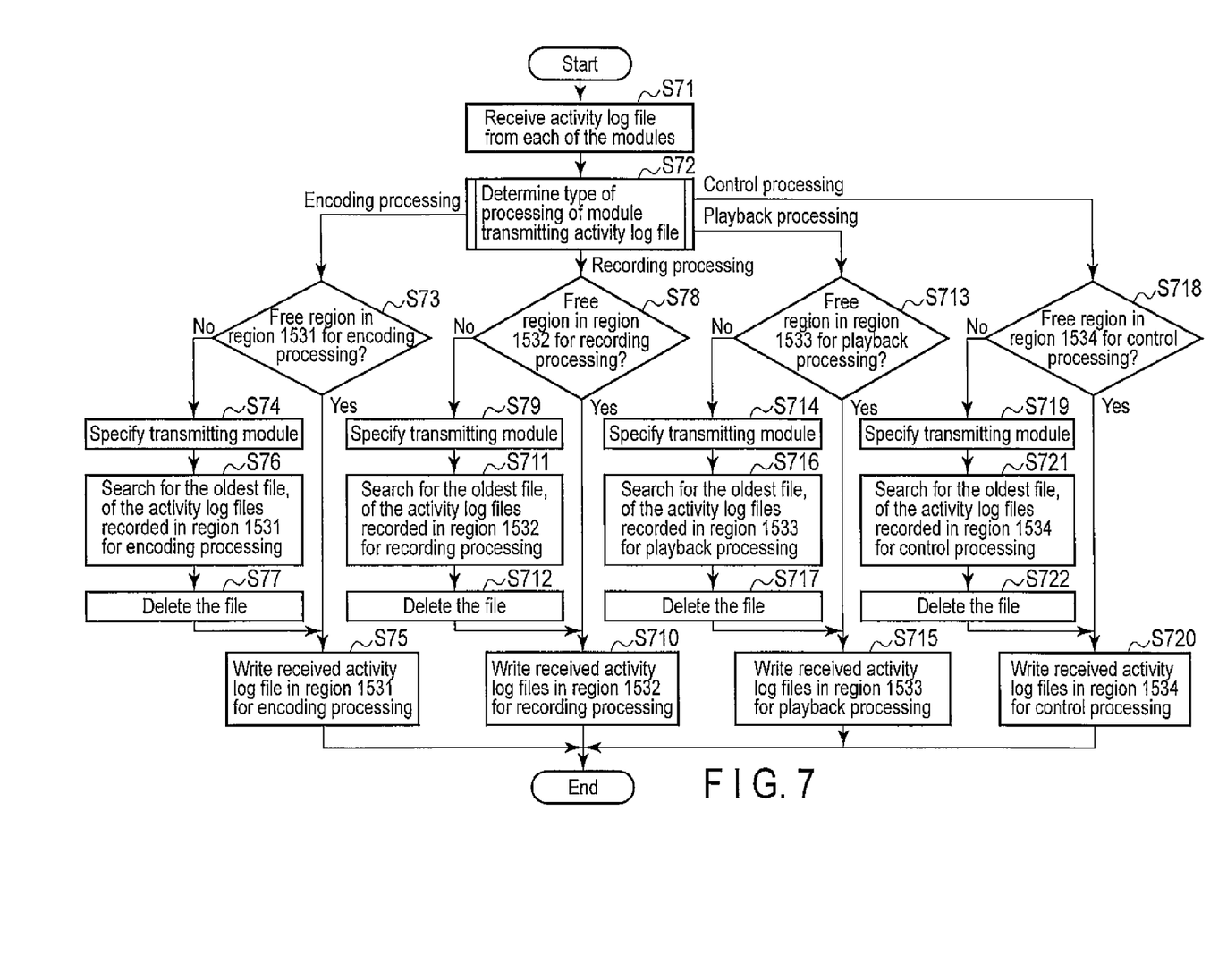
FIG. 7 is a flowchart of Example 3 in which the maintenance/management controller in FIG. 2 records the activity log files in the log storing medium.

FIG. 7 is a flowchart of Example 3 in which the maintenance/management controller 1521 records the activity log file in the log storing medium 153. In Example 3, the maintenance/management controller 1521 allocates recording regions in the log storing medium 153 to respective module types as shown in FIG. 6.

First, if the maintenance/management controller 1521 receives the activity log file from each of the modules (step S71), the maintenance/management controller 1521 determines the type of processing of the module which has transmitted the received activity log file by referring to an identifier attached to the activity log file (step S72). If the type of processing of the module transmitting the activity log file is the encoding processing, the maintenance/management controller 1521 determines whether the region 1531 in the log storing medium 153 has a free region (step S73). If the region 1531 has no free region (NO in step S73), the maintenance/management controller 1521 identifies the transmitting module by referring to the identifier (step S74). If the region 1531 has a free region (YES in step S73), the maintenance/management controller 1521 records the received activity log file in the free region in the region 1531 (step S75).

After step S74, the maintenance/management controller 1521 searches for the oldest activity log file in the module identified in step S74, of the activity log files recorded in the region 1531 (step S76). The maintenance/management controller 1521 forms a free region by deleting the oldest activity log file searched in step S44 (step S77). Then, the maintenance/management controller 1521 shifts the processing to step S75.

If the type of processing of the module transmitting the activity log file is determined as the recording processing in step S72, the maintenance/management controller 1521 executes recording control of the activity log file for the recording processing in the formed free region in the region 1532 by the same processing as that in steps S73 to S77 (steps S78 to S712).

If the type of processing of the module transmitting the activity log file is determined as the playback processing in step S72, the maintenance/management controller 1521 executes recording control of the activity log file for the playback processing in the formed free region in the region 1533 by the same processing as that in steps S73 to S77 (steps S713 to S717).

If the type of processing of the module transmitting the activity log file is determined as the control processing in step S72, the maintenance/management controller 1521 executes recording of the activity log file for the control processing in the formed free region in the region 1534 by the same processing as that in steps S73 to S77 (steps S718 to S722).

As described above, if the maintenance/management controller 1521 receives the new activity log file in a state in which the log storing medium 153 has no free region, the maintenance/management controller 1521 searches for the oldest activity log file among the activity log files created by the module which has transmitted the received activity log files. Then, the maintenance/management controller 1521 deletes the oldest activity log file to form a free region and writes the new activity log file to the formed free region. Thus, a preset number of activity log files can be thereby held for each of the modules.

Therefore, according to the video server 10 of the First Embodiment, the activity log files output from each of the modules 11 to 14 can be totally managed irrespective of the limitation in the capacity of the log storing medium 153.

[Second Embodiment]

Figure 8:
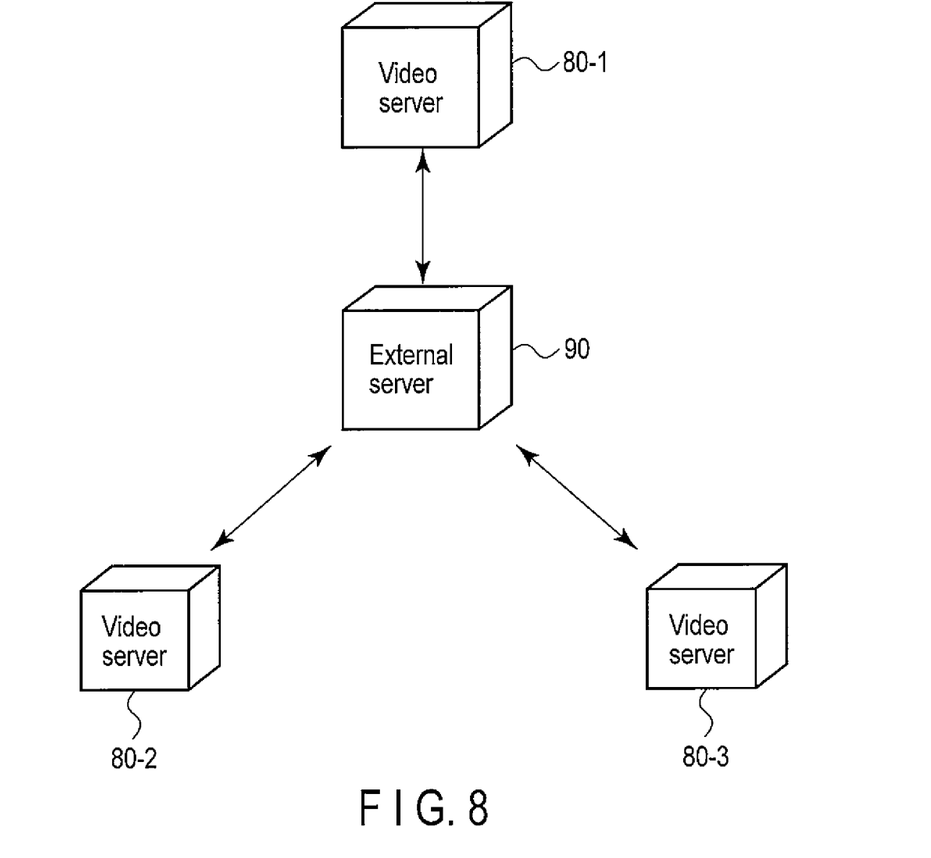
FIG. 8 is an illustration showing an example of a configuration of a broadcast program transmission system including a video server according to a second embodiment.

FIG. 8 is an illustration showing an example of a configuration of a broadcast program transmission system including a video server 80 according to a second embodiment. The broadcast program transmission system shown in FIG. 8 includes video servers 80-1 to 80-3 and an external server 90. The video camera 20, playback deck 30, editor 40, operation terminal 50, monitor 60 and broadcast installation 70 are connected to the video servers 80-1 to 80-3, similarly to the video server 10 of FIG. 2, although not shown in FIG. 8.

The external server 90 is a general-purpose file server installed outside the video servers 80-1 to 80-3. The file server is, for example, a FTP server, and has a larger capacity than log storing mediums of the video servers 80-1 to 80-3. The external server 90 records activity log files supplied from the video servers 80-1 to 80-3. The external server 90 may be a large hard disk shared by the video servers 80-1 to 80-3.

Figure 9:
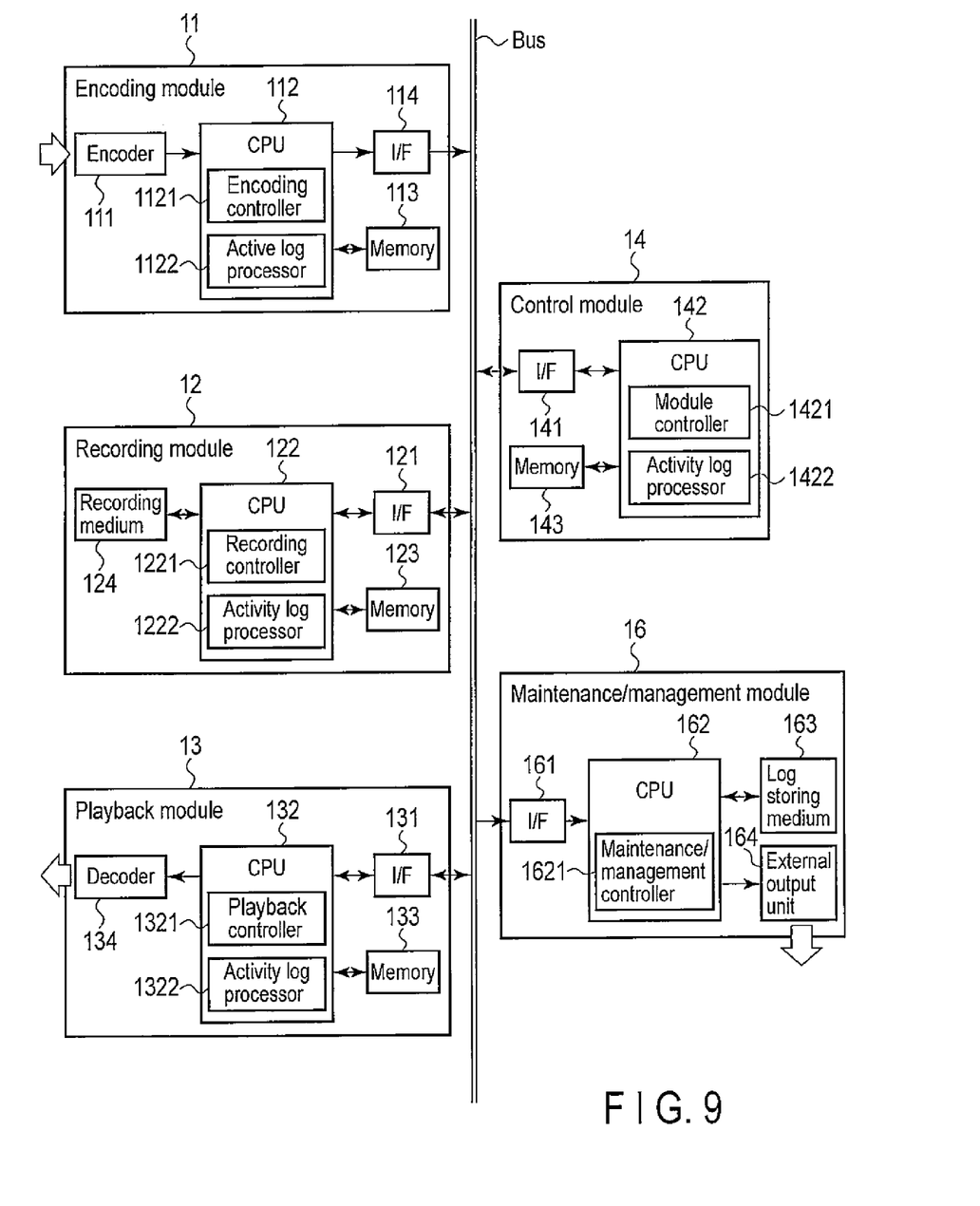
FIG. 9 is a block diagram showing a functional configuration of the video server in FIG. 8.

FIG. 9 is a block diagram showing a functional configuration of the video server 80 according to the Second Embodiment. Since the video servers 80-1 to 80-3 are structurally same as each other, they will be described below as the video server 80. In addition, the portions shown in FIG. 9 common to those in FIG. 2 are denoted by the same reference numbers.

The video server 80 shown in FIG. 9 includes the encoding module 11, the recording module 12, the playback module 13, the control module 14, and a maintenance/management module 16.

The maintenance/management module 16 includes an interface unit 161, a CPU 162, a log storing medium 163 and an external output unit 164.

The interface unit 161 connects the maintenance/management module 16 with the bus. The interface unit 161 receives the activity log file output from each of the modules via the bus.

The external output unit 164 outputs the activity log files to the external server 90 under control of a maintenance/management controller 1621.

The CPU 162 implements the maintenance/management controller 1621 by executing an application program. The maintenance/management controller 1621 controls recording of the activity log file output from each of the modules in the log storing medium 163. In addition, the maintenance/management controller 1621 controls the output of the activity log files to the outside.

The processing of the maintenance/management controller 1621 executing maintenance/management of the activity log files will be described below.

Example 1

Figure 10:
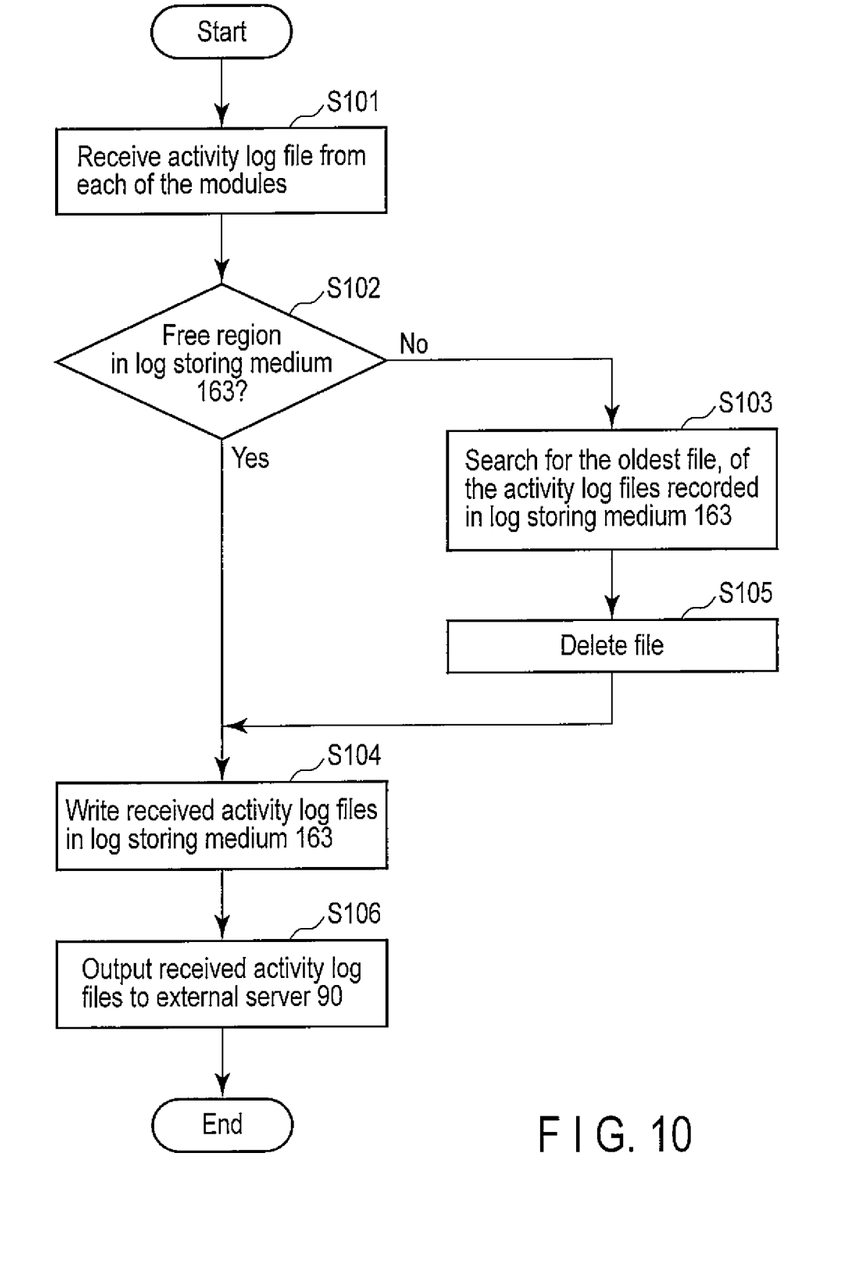
FIG. 10 is a flowchart of Example 1 in which a maintenance/management controller in FIG. 9 manages an activity log files in a log storing medium.

FIG. 10 is a flowchart of Example 1 in which the maintenance/management controller 1621 records the activity log file in the log storing medium 163 and outputs the activity log file from the external output unit 164 to the external server 90.

First, the maintenance/management controller 1621 receives the activity log file from each of the modules (step S101). The maintenance/management controller 1621 checks presence and absence of a free region in the log storing medium 163 (step S102). If the log storing medium 163 has no free region (NO in step S102), the maintenance/management controller 1621 searches for the oldest activity log file among the activity log files recorded in the log storing medium 163 (step S103). If the log storing medium 163 has a free region (YES in step S102), the maintenance/management controller 1621 records the received activity log files in the free region in the log storing medium 163 (step S104).

The maintenance/management controller 1621 forms a free region by deleting the oldest activity log file searched in step S103 (step S105). The maintenance/management controller 1621 shifts the processing to step S104.

When the maintenance/management controller 1621 writes the activity log file in the log storing medium 163 in step S104, the maintenance/management controller 1621 provides the external output unit 164 with an instruction to output the written activity log file to the external server 90 (step S106).

As described above, the maintenance/management controller 1621 outputs the same activity log file as the activity log file written in the log storing medium 163 to the external server 90. In other words, the contents of the activity log files recorded in the log storing medium 163 and the external server 90 correspond to each other. Therefore, if the activity log file needs to be referred to and the activity log file is the latest activity log file, the activity log file in any one of the log storing medium 163 and the external server 90 may be referred to, and the maintenance property can be improved.

In addition, the capacity of the external server 90 is greater than the capacity of the log storing medium 163. In other words, the activity log file is stored in the external server 90 which has the greater capacity than the capacity of the log storing medium 163. Since the activity log file can be thereby stored in the greater capacity for a long period, the activity conditions in a previous long period can be confirmed.

The activity log files manage in the respective video servers 80-1 to 80-3 are totally managed in the external server 90. Therefore, since the activity log files in the video servers 80-1 to 80-3 can be efficiently collected upon confirming the operations of the video servers 80-1 to 80-3, the efficiency in the maintenance operation can be improved.

The maintenance/management controller 1621 executes the output of the activity log files to the external server 90 in the same file format as that upon recording the activity log files in the log storing medium 163. The activity log files can be thereby easily handled in the external server 90.

Example 2

Figure 11:
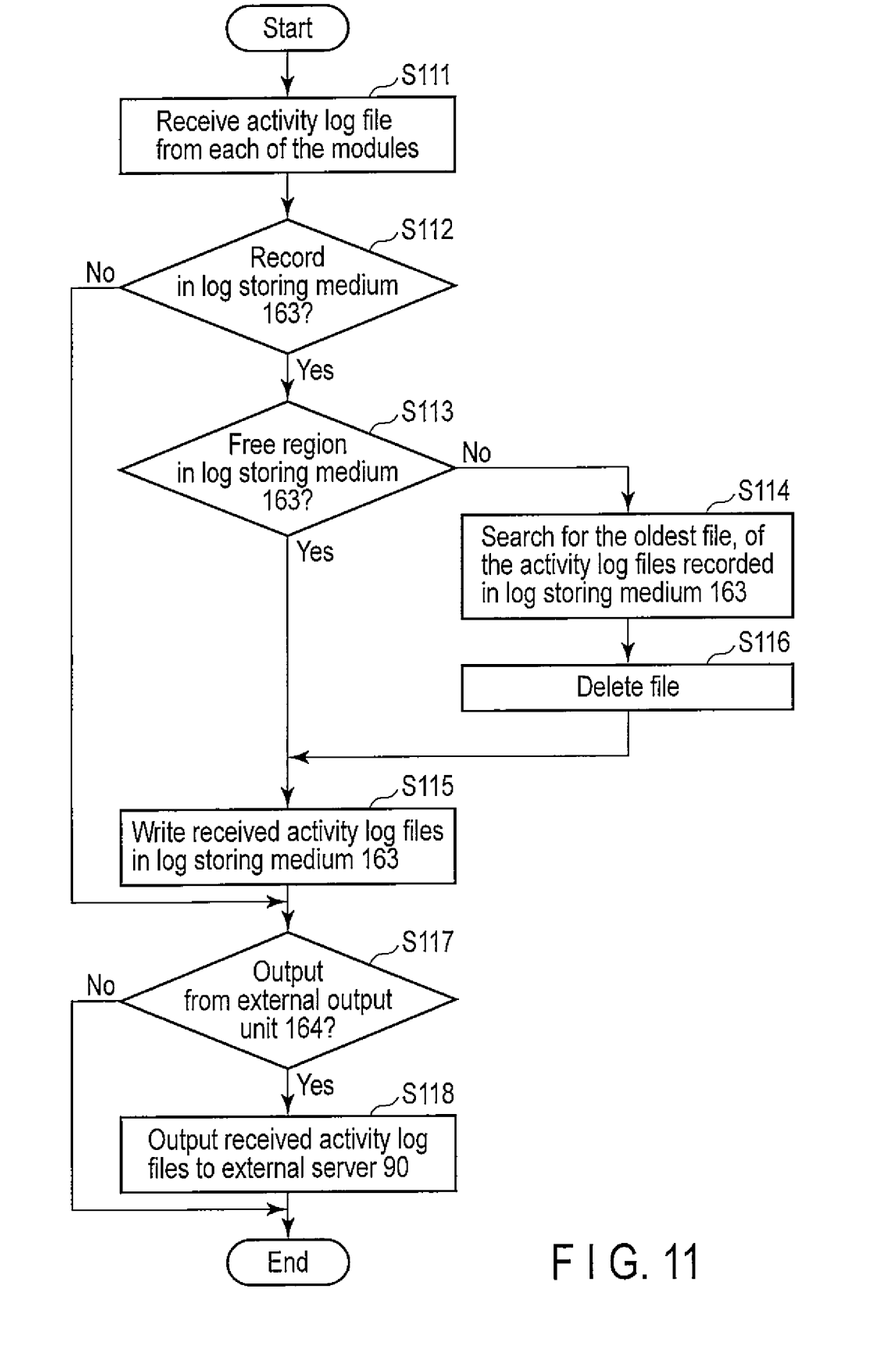
FIG. 11 is a flowchart of Example 2 in which the maintenance/management controller in FIG. 9 manages an activity log files in a log storing medium.

FIG. 11 is a flowchart of Example 2 in which the maintenance/management controller 1621 records the activity log file in the log storing medium 163 and outputs the activity log file from the external output unit 164 to the external server 90.

In the maintenance/management controller 1621 according to Example 2, it is preset under an instruction supplied from the outside whether the activity log file should be recorded in the log storing medium 163 or not and whether the activity log file should be output to the external server 90 or not.

First, the maintenance/management controller 1621 receives the activity log file from each of the modules (step S111). The maintenance/management controller 1621 determines whether the received activity log files should be recorded in the log storing medium 163 or not (step S112). If the received activity log files should be recorded in the log storing medium 163 (YES in step S112), the maintenance/management controller 1621 executes the same control as that in steps S102 to S105 in FIG. 10 (steps S113 to S116) and determines whether the received activity log files should be recorded in the external server 90 (step S117). If the received activity log files should not be recorded in the log storing medium 163 (NO in step S112), the maintenance/management controller 1621 shifts the processing to step S117.

In step S117, if the received activity log file should be output to the external server 90 (Yes in step S117), the maintenance/management controller 1621 provides the external output unit 164 with an instruction to output the received activity log file to the external server 90 (step S118). If the received activity log file should not be output to the external server 90 (No in step S117), the maintenance/management controller 1621 terminates the processing.

It is thus preset whether the activity log file should be written in the log storing medium 163 or not and whether the activity log file should be output from the external output unit 164 or not, and the maintenance/management controller 1621 manages the received activity log file in accordance with these settings. Thus, for example, if the remaining capacity of the log storing medium 163 is decreased, the received activity log file can not be recorded in the log storing medium 163, but in the external server 90 alone. In addition, if the received activity log file does not need to be output to the external server 90, the received activity log file can be recorded in the log storing medium 163 alone.

In Example 2, it has been exemplified that it is preset under the instructions supplied from the outside whether the activity log file should be recorded in the log storing medium 163 or not, and whether the activity log file should be output to the external server 90 or not. However, the example is not limited to this. For example, it may be preset under the instructions supplied from the outside whether the activity log file should be recorded in the log storing medium 163 or not, or whether the activity log file should be output to the external server 90 or not.

In Example 1 and Example 2, the maintenance/management controller 1621 may include a number sequence and/or character string capable of identifying the video server 80 in the file name of the activity log file output from the external output unit 164. For example, unduplicated management numbers and/or names are preset in the video servers 80-1 to 80-3, respectively. Then, the maintenance/management controller 1621 includes the management numbers or names in the file names upon outputting the activity log files from the external output unit 164.

Figure 12:
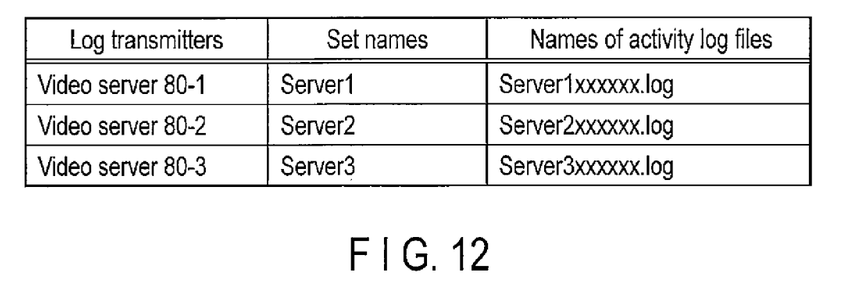
FIG. 12 is a table showing file names of activity log files added by the maintenance/management controller in FIG. 9.

FIG. 12 is a table showing examples of the file names of the activity log files. In FIG. 12, Server1, Server2 and Server3 are set for the video servers 80-1, 80-2 and 80-3, respectively, and the file names capable of identifying the transmitters, such as Server1*xxxxxx*.log, Server2*xxxxxx*.log and Server3*xxxxxx*.log are attached to the activity log files output from the video servers, respectively.

In addition, if the video servers 80-1 to 80-3 and the external server 90 are connected by an IP network, different IP addresses are allocated to the video servers 80-1 to 80-3, respectively. The maintenance/management controller 1621 may determine the file names by using the allocated IP addresses.

Thus, even if a plurality of video servers are connected to the external server 90, it can be distinguished from which video server the activity log file is output on the external server 90.

Figure 13:
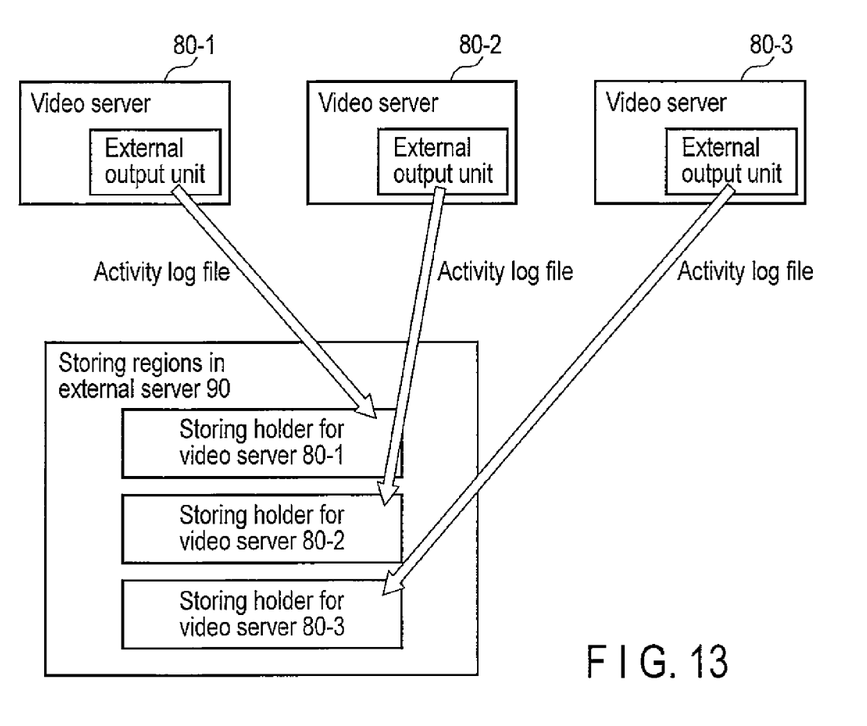
FIG. 13 is an illustration showing an example in which inner regions in an external server in FIG. 8 are allocated to respective video servers.

In addition, in Example 1 and Example 2, the memory region in the external server 90 may be divided into a plurality of regions and the divided regions may be set to correspond to the video servers 80-1 to 80-3, respectively. FIG. 13 is an illustration showing an example of allocating the regions in the external server to the video servers 80-1 to 80-3, respectively. At this time, the maintenance/management controller 1621 sets the file names of the activity log files while including the names capable of identifying the respective servers in the file names.

In Example 2, the inner regions of the log storing medium 163 may also be allocated to the respective types of the processing of the modules as shown in FIG. 5. At this time, the maintenance/management controller 1621 executes processing formed by applying the processing in FIG. 10 or FIG. 11 to the processing in FIG. 4.

The inner regions of the log storing medium 163 may be allocated to the respective types of the processing of the modules as shown in FIG. 6. At this time, the maintenance/management controller 1621 executes processing formed by applying the processing in FIG. 10 or FIG. 11 to the processing in FIG. 7. It can be thereby set for each processing whether the activity log files are recorded in the log storing medium 163 or output to the external server 90. For this reason, the maintenance efficiency is further improved.

(Other Embodiments)

In the First and Second Embodiments, it has been described that the activity log processors 1122, 1222, 1322 and 1422 create the activity log files if a predetermined capacity of the activity log is stored. However, the embodiments are not limited to this. For example, the activity log processors 1122, 1222, 1322 and 1422 may create the activity log files when a preset period has passed after recording the activity log.

In the First and Second Embodiments, it has been described that the video servers 10, 80 include the encoding module 11, recording module 12, playback module 13 and control module 14. However, the embodiments are not limited to this. For example, the video servers 10, 80 may include not only the encoding module 11, recording module 12, playback module 13 and control module 14, but also various modules, for example, an external control module configured to receive the control signal supplied from the external operation terminal 50 and, if the video server is constituted by a plurality of housings, an external bus connection module configured to make connection among the plurality of housings, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server comprising:
a plurality of processing modules each comprising a CPU (Central Processing Unit) configured to control an operation, the CPU creating an activity log based on a control condition of the operation and outputting the created activity log as an activity log file; and
a maintenance/management module configured to manage the activity log file output from each of the plurality of processing modules,
the maintenance/management module comprising:
a storing medium configured to record the activity log file; and
a maintenance/management controller configured to determine whether the storing medium has a free region for recording the activity log file, write the activity log file in the storing medium if the storing medium has the free region, delete an oldest activity log file recorded in the storing medium to form a free region if the storing medium has no free region, and write the activity log file in the formed free region,
the CPU of each of the plurality of processing modules creating the activity log file by attaching an identifier capable of identifying the own module to the activity log file,
the storing medium being divided into regions, the divided regions having capacities preset for respective types of processing of each of the plurality of processing modules, and
the maintenance/management controller determining the type of processing of a transmitter of the activity log file, by the identifier, determining whether the divided region of which the type of processing corresponds to the transmitter has a free region for recording the activity log file, recording the activity log file in the divided region if the divided region has the free region, and deleting the oldest activity log file recorded in the divided region to form a free region if the divided region has no free region, and writing the activity log file in the formed free region,
wherein:
the capacity of each of the divided regions in the storing medium is set in accordance with a number of the processing modules executing the same processing, and
the maintenance/management controller is further configured to determine the processing module transmitting the activity log file, by the identifier, to determine whether the divided region, to which the determined transmitter corresponds has a free region for recording the activity log file, to record the activity log file in the divided region when the divided region has the free region, and, when the divided region has no free region, to delete the oldest activity log file created b the determined processing module recorded in the divided region to form a free region and to write the activity log file in the formed free region.

2. The video server of claim 1, wherein:
the maintenance/management module further comprises an external output unit configured to output the activity log file to an external device, and
the maintenance/management controller is configured to control the external output unit to output the activity log files supplied from the plurality of processing modules.

3. The video server of claim 1, wherein:
the maintenance/management module further comprises an external output unit configured to output the activity log file to an external device, and
the maintenance/management controller is configured to control the external output unit to output the activity log file recorded in the storing medium.

4. The video server of claim 1, wherein:
the maintenance/management module further comprises an external output unit configured to output the activity log file to an external device, and
the maintenance/management controller comprises a setting indicating whether the activity log files supplied from the plurality of processing modules should be recorded in the storing medium or not, and/or whether the activity log files should be output from the external output unit or not, and
the maintenance/management controller is configured to execute a recording control of the activity log files in the storing medium and an output control of the activity log files to the external output unit in accordance with the setting.

5. The video server of claim 1, wherein:
the maintenance/management module further comprises an external output unit configured to output the activity log file to an external device, and
the maintenance/management controller is configured to attach a file name capable of identifying the server to the activity log file output from the external output unit to the external device.

6. A method of managing an activity log file, comprising:
receiving the activity log file, to which an identifier capable of identifying the own module is attached, output from a processing module, the processing module comprising a CPU (Central Processing Unit), the CPU configured to create an activity log based on a control condition of an operation and output the created activity log as the activity log file;
dividing the storing medium into regions, the divided regions having capacities preset for respective types of processing of the processing module;
determining the type of processing of a transmitter of the activity log file by the identifier;
determining whether the divided region of which the type of processing corresponds to the transmitter has a free region for recording the activity log file;
deleting an oldest activity log file recorded in the divided region to form a free region if the storing medium has no free region;
writing the received activity log file in the formed free region in the divided region;
setting the capacity of each of the divided regions in the storing medium in accordance with a number of the processing modules executing a same processing;
determining the processing module transmitting the activity log file by the identifier; and
deleting the oldest activity log file created by the determined processing module recorded in the divided region to form a free region when the free region has no free region.

7. The method of claim 6, further comprising outputting the activity log files, supplied from the plurality of processing modules, to an external device.

8. The method of claim 6, further comprising outputting the activity log file, recorded in the storing medium, to an external device.

9. The method of claim 6, further comprising:
recording the activity log files in the storing medium in accordance with a setting indicating whether the activity log files supplied from the plurality of processing modules should be recorded in the storing medium or not; and
outputting the activity log files to an external device in accordance with a setting indicating whether the activity log files should be output to the external device from an external output unit or not.

10. The method of claim 6, further comprising:
upon outputting the activity log files supplied from the plurality of processing modules to the external device, attaching file names capable of identifying the processing modules to the output activity log files.

\* \* \* \* \*